United States Patent

[11] 3,582,155

| [72] | Inventors | Gaston Marier;<br>Guy Chaumont, both of Princeville,<br>Quebec, Canada |
|---|---|---|
| [21] | Appl. No. | 721,242 |
| [22] | Filed | Apr. 15, 1968 |
| [45] | Patented | June 1, 1971 |
| [73] | Assignee | said Chaumont assignor to Poly-Traction Inc.<br>Tring Junction, Quebec, Canada |

[54] TREAD FOR MOTOR-DRIVEN VEHICLE
7 Claims, 8 Drawing Figs.

| [52] | U.S. Cl. | 305/38 |
|---|---|---|
| [51] | Int. Cl. | B62d 55/24 |
| [50] | Field of Search | 305/38, 35 |

[56] References Cited

UNITED STATES PATENTS

| 3,416,845 | 12/1968 | Scanland | 305/38 |
|---|---|---|---|
| 2,661,249 | 12/1953 | Bonmartini | 305/35(EB) |
| 2,899,242 | 8/1959 | Bombardier | 305/38 |
| 3,285,677 | 11/1966 | Marier | 305/38 |
| 3,416,845 | 12/1968 | Scanland | 305/38 |
| 3,451,729 | 6/1969 | Roy | 305/38 |

FOREIGN PATENTS

| 768,529 | 10/1967 | Canada | 305/38 |
|---|---|---|---|

Primary Examiner—Richard J. Johnson
Attorney—Alan Swabey

ABSTRACT: Endless tread of the type used on single track vehicles suitable for travelling on snow.

PATENTED JUN 1 1971 3,582,155
SHEET 1 OF 2
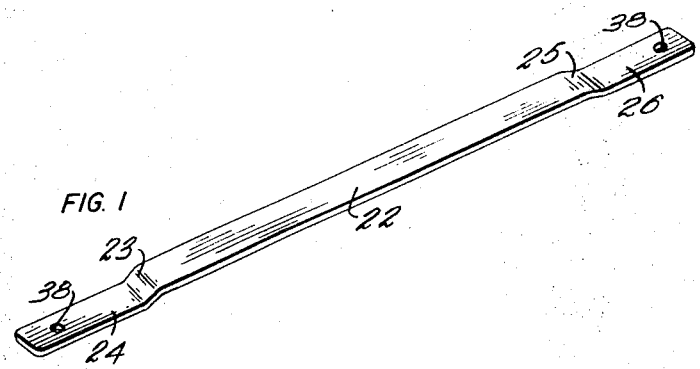
FIG. 1
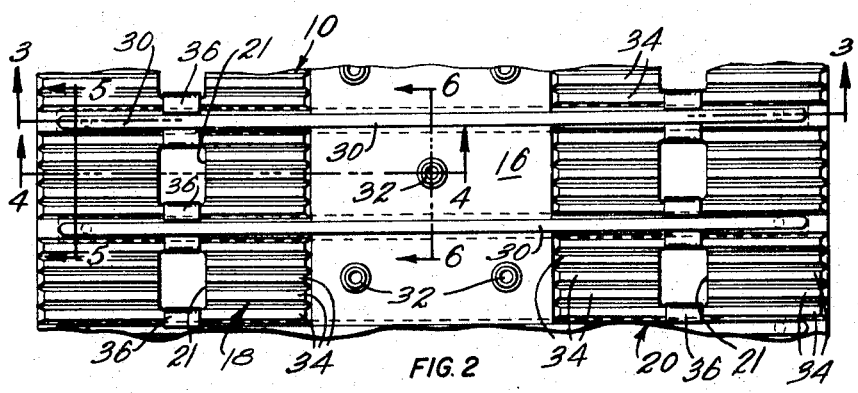
FIG. 2
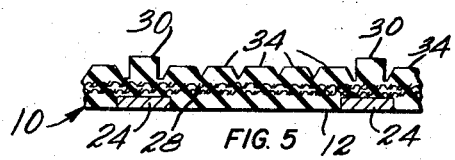
FIG. 5
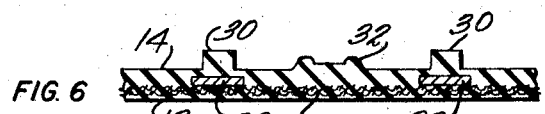
FIG. 6
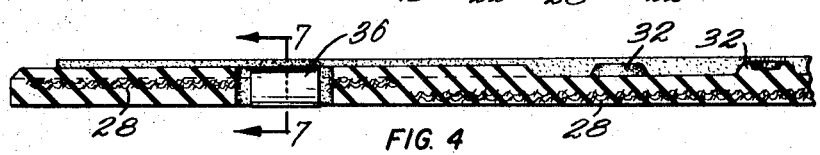
FIG. 4
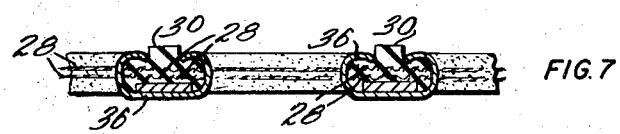
FIG. 7
INVENTORS
Guy CHAUMONT
Gaston MARIER
ATTORNEY

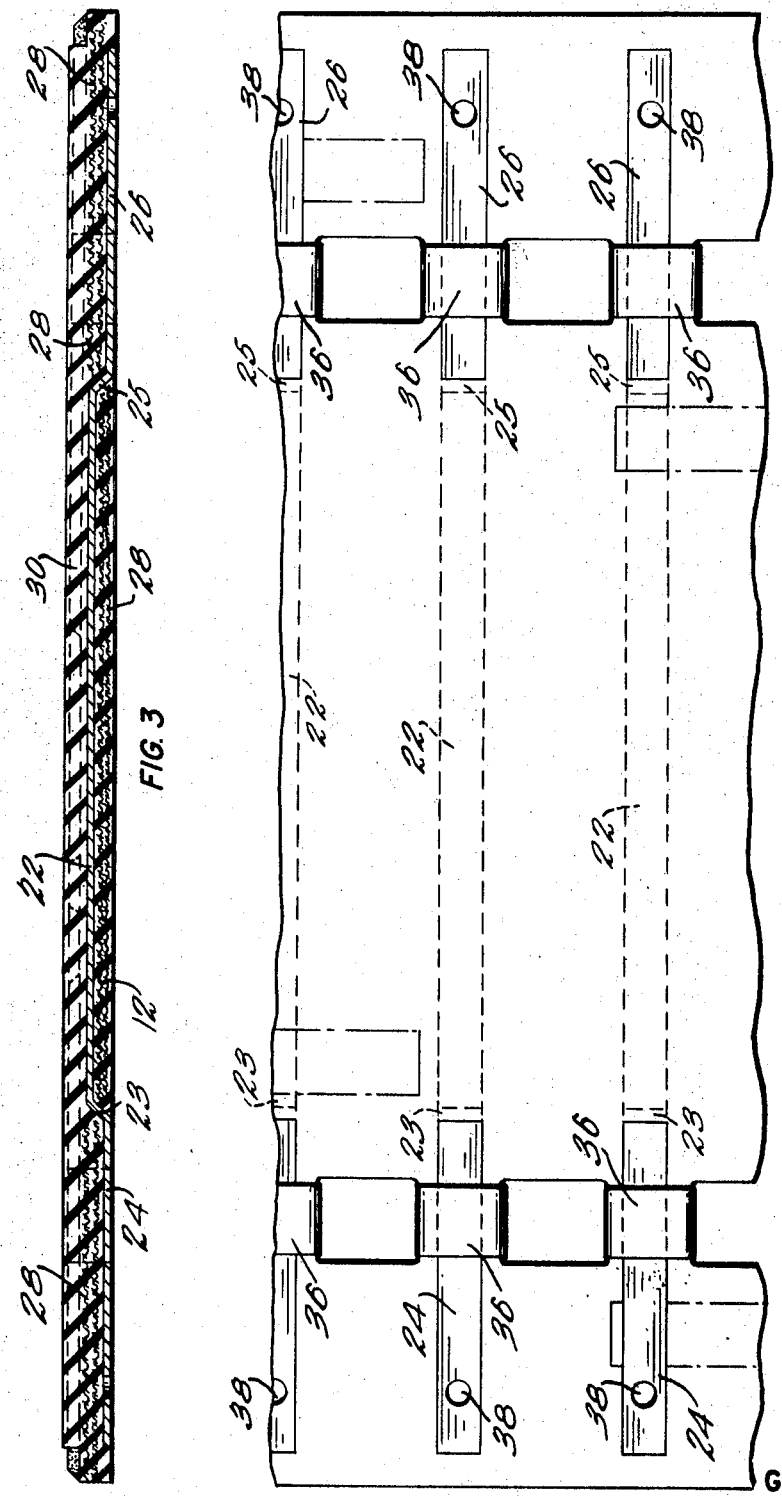

TREAD FOR MOTOR-DRIVEN VEHICLE

The present invention relates to improvements in the manufacture of endless treads and more particularly to endless belts of the type normally used as a driving track on a vehicle suitable for travelling on snow, mud, sand, etc. and in forward or reverse direction.

The lightweight snow vehicle popular today is of the type used for the transportation of one or two persons and which comprises a light, open chassis supported and driven mainly by a single endless track and usually steered by a pair of short skis forward of the endless track. The endless track is usually supported about a system of resiliently biased idlers or rollers and is generally driven directly by a pair of sprocket wheels which engage parallel rows of corresponding openings in the track, It has been found that the endless track, which is usually constructed of elastomeric belt material, must be thin and relatively flexible in a longitudinal direction in order to flex about the sprocket and idler system but it must be relatively rigid in its lateral extent to withstand the driving force of the sprocket teeth, to maintain alignment between corresponding sprocket openings in the track, and to withstand undue deformation as may be caused by the vehicle passing over rough terrain.

Heretofore, certain improvements have been made in such tracks as described in Canadian Pat. No. 605,317, Bombardier, 1960 (U.S. Pat. No. 2,899,242, 1959) and Canadian Pat. No. 718,800, Marier, 1965. These patents, among other things, disclose the use of lateral reinforcing rods of circular cross section, embedded in the elastomeric track. Such tracks met the requirements of lateral stiffness. However, the use of the rods caused certain distortion in the belt over long periods of time. It has also been found that the rods used are often dislodged from the track, sometimes causing damage to the vehicle.

It is an aim of the present invention to provide an improved track which will substantially reduce the above-mentioned distortion and increase the life of the track.

It is also an aim of the present invention to improve the structure of the track so that a suitably flat rigid inner surface is provided along the path of the idlers whereby the idlers will be less subject to detailed contours of the ground and the treads of the belt thus reducing certain undue vibrations at high speeds.

A construction in accordance with one feature of the invention comprises an endless belt of resilient material having parallel inner and outer surfaces of longitudinal median portion and longitudinal edge portions bordering the the median portion. The belt is provided with a plurality of spaced-apart reinforcing members of flat cross section wherein the members are embedded in the median portion and the edge portions of the members are stepped therefrom to lie in the edge portions of the belt, close to or flush with the inner surface of the belt.

Another feature of the endless track according to the invention is that it can comprise an endless belt having inner and outer surfaces, a longitudinal median portion, and longitudinal edge portions bordering the median portions. The longitudinal edge portions are relatively thicker than the median portion and are fluted laterally at the outer surface in a sawtooth or corrugated manner. The idler path of the vehicle is substantially on the inner surface of the edge portions.

In more specific embodiments of an endless track, a longitudinally extending row of spaced-apart openings is defined in each edge portion to accommodate the sprocket teeth. These rows are parallel to each other and a plurality of reinforcing members of flat cross section extends laterally of the belt between the openings. Further wear-resistant clips can be provided between the openings on the belt.

Having thus generally described the nature of the invention, particular reference will be made to the accompanying drawings illustrating a preferred embodiment thereof and in which:

FIG. 1 is a perspective view of the detailed structure member of the endless track.

FIG. 2 is the fragmentary plan view of the belt as seen from the outer surface.

FIG. 3 is a vertical cross section of the belt taken along the lines 3-3 of FIG. 2.

FIG. 4 is an enlarged vertical cross section taken along lines 4-4 of FIG. 2.

FIG. 5 is an enlarged cross section taken along the lines 5-5 of FIG. 2.

FIG. 6 is an enlarged cross section taken along lines 6-6 of FIG. 2.

FIG. 7 is a vertical cross section taken along lines 7-7 of FIG. 4.

FIG. 8 is a fragmentary plan view of the belt taken from the inner side of the endless belt.

The belt as shown in FIG. 2 is generally denoted by the numeral 10. The belt 10 is normally molded as is known in the art. The belt 10 has an inner surface 12 and an outer gripping surface 14. The belt 10 is divided for reference purposes into three longitudinally extending portions: the median portion 16 and edge portions 18 and 20. In the present embodiment, the edge portions 18 and 20 have preferable a width the same as the median portion 16. A row of openings 21 is provided longitudinally of the endless belt in each edge portion 18 and 20. These openings 21 are provided to correspond with teeth on a pair of sprocket wheels (not shown) which would be mounted on a vehicle. Within the belt 10 are reinforcing members 22 which are preferable made in a flat rectangular construction as shown in FIG. 1 with step end portions 24 and 26 corresponding with the end portions 18 and 20 of the belt.

The reinforcing member 22 is embedded in the belt as shown in FIG. 2 with the central portion of the member 22 located midway in the median portion 16 of the belt. The stepped portions 24 and 26 of the bar located in the end portions 18 and 20 such that they are flush with the inner surface 12 of the belt, FIG. 3. Spring clips 36 are provided at the portion of the belt between the openings 21 and at the same time help to secure the end portions 24 and 26 of the reinforcing member 22 of the belt 10.

In the present embodiment, openings 38 are provided at each end of the reinforcing member 22. This enables the positioning of the reinforcing member in the mold while fabricating the belt 10. Also, studs (not shown) can be inserted in the openings 38 of the reinforcing members 22 so as to increase the gripping action of the belt 10.

One of the disadvantages of the use of the rods of circular cross section described above, is that to be embedded in a belt, the belt must be of a substantial thickness. Since the belt must run around the end sprockets and idlers over a relatively short radius, substantial tension exists in the part of the belt close to the outer surface while compression is created in the portion of the belt near the inner surface. With rods, the elastomeric material which, of course, tended to compress on the bottom half of the rod while towards the top half of the rod, the elastomeric material was pulling way from the rod. Since the steel rod does not compress or change physically when these forces are being applied, substantial distortion was caused about the rod at its adhesion surfaces with the compression and tension portions of the belt. In the present case, the use of a relatively flat bar or reinforcing member 22 of relatively small thickness is provided, and, therefore, the bar is likely to be in either the compression or the tension region of the belt so that the forces acting about the bar are substantially uniform. Another explanation of the distortion which occurred about the rods in the prior art belts due to the relatively large diameter of the rod, the tangential linear velocity of the outermost portion of the rod and the material surrounding it is greater than the tangential velocity of the portion of the rod and the elastomeric material surrounding it. In the present case, since the depth of the reinforcing bar is relatively nominal, the linear velocity of any point in the bar is relatively and practically constant.

In a particular embodiment, using the reinforcing bars 22, belts have been made in which the median portion 16 is as thin as one-fourth inch. Also, the deformed portions of the bar 22 which are indicated at 23 and 25, are close to the apertures 21 and because of these deformations, the lateral rigidity around these points is increased thus improving the rigidity of the belt about the apertures or openings 21. Furthermore, when the track is operated over very rough ground, the section modulus of the reinforcing member 22 is increased because of the deformations 23 and 25.

In order to embed the reinforcing members 22 in the belt, a rubber cement or rubber adherent metal coatings can be used to adhere the reinforcing member 22 to the elastomeric material of the belt. The reinforcing member 22 in a preferred embodiment is made of spring steel with high flexibility but other synthetic materials such as plastic with similar flexibility could be used.

Reinforcing plies 28 which can be of tire cord fabric or nylon fabric are also embedded in the belt. Part of the fabric plies 28 are inlaid on the underside of the end portions 24 and 26 of the reinforcing member 22 as shown in FIGS. 3, 4, 6 and 7. In the median portion of the belt the tire cord or nylon plies 28 are on the opposite side of the reinforcing member 22 as shown in FIGS. 3 and 6.

On the gripping or outer surface of the belt as shown in FIG. 2, the lateral gripping ribs 30 are provided which are coextensive with the inlaid reinforcing members 22. These ribs 30 are the main-gripping means on the belt.

In between each gripping rib 30 on the end portions 18 and 20 of the belt are provided a plurality of closely disposed ribs 34. These ribs 34 have in cross section, as shown in FIG. 5, a saw-toothed pattern. These ribs 34 are such that they increase the thickness of the end portions 18 and 20 relative to the median portion 16, although they are just as pliable longitudinally, as the belt goes over the sprocket (not shown).

By thickening the edge portions 18 and 20, that is by providing the ribs 34 between the ribs 30, the belt portion between ribs 30 is supported so as to prevent the belt from sagging between the ribs 30. In the prior art, where the equivalent of ribs 30 are provided, the rollers or idlers which travel over the edge portions would vibrate at high speeds because of the wavy surface provided by the belt sagging between the various gripping ribs caused by the roller's load. By providing the ribs 34 in a close arrangement, the belt portion between the ribs 30 is properly supported and presents a flat, rigid surface for the suspension rollers.

Studs 32 are provided in the median portion of the belt and are staggered as shown in FIG. 2 in order to increase a gripping potential belt as will be described hereinafter.

Studs 32 are staggered as mentioned above for the following reasons. As the belt is driven, the studs 32 will react against the surface of the snow digging a trough in the snow. If the succeeding stud 32 was exactly aligned with the first, the second stud 32 would merely follow in the same trough opened by the first stud, thus no reaction. However, by staggering the studs 32, each stud 32 starts its own path in the snow thus increasing the snow shearing resistance which provides a better gripping effect.

The edges of the wearing clips 36 are located between the apertures 21 on the outer surface 14 flush therewith. In this way, the wearing clips 36 will not be accidentally torn open by ground obstructions and excessive wear of the clips when the track is operating on pavement, icy surfaces or hard ground will be reduced.

We claim:

1. A driving track for a vehicle or the like adapted for direct engagement by parallel spaced driving engagement means, comprising a belt having a flat inner surface and an outer gripping surface, a longitudinal median portion, and longitudinal edge portions bordering the median portion, longitudinal rows of spaced-apart mating engagement means defined in each edge portion to accommodate the driving engagement means, the rows being parallel to each other, the longitudinal edge portions being thicker than the median portion; the belt including a plurality of spaced-apart gripping ribs extending laterally of the gripping surface, and the sections of the edge portions between said gripping ribs being provided with a plurality of closely spaced lateral supporting ribs, whereby a relatively rigid inner surface is provided along said edge portions to receive the idler wheels.

2. An endless driving track as defined in claim 1 wherein the outer surface of the median portion is provided with studs disposed in a staggered pattern.

3. A driving track as defined in claim 1 including a plurality of reinforcing members of flat cross section having a central portion with terminal end portions defined by an intermediate step deformation, said reinforcing members extending transversely of the track and imbedded therein, the reinforcing members having a portion imbedded intermediately between the inner and outer belt surfaces and the remaining portions exposed at the flat inner surface of the belt with said step deformation located where the belt edge portions border the median portion.

4. A driving track for a track-laying vehicle for direct engagement by parallel driving means comprising a belt having a flat inner surface and an outer gripping surface, said belt including a longitudinal median portion and longitudinal edge portions bordering the median portion, said edge portions each including a row of spaced-apart mating engagements means, the rows being parallel to each other for accommodating parallel driving means, the longitudinal edge portions being uniformly thicker across the entire width thereof than the median portion and providing a relatively rigid inner surface along the entire surface thereof for distributing the load of the vehicle substantially uniformly thereover; and a plurality of reinforcing members of flat cross section having a central portion with terminal end portions defined by an intermediate step deformation, said reinforcing members extending transversely of the track and imbedded therein, the reinforcing members having a portion imbedded intermediately between the inner and outer belt surfaces and the remaining portions exposed at the flat inner surface of the belt with said step deformation located where the belt edge portions border the median portion.

5. An endless belt used for a driving track for a vehicle as defined in claim 4 wherein at least one reinforcing ply is embedded in the edge portions adjacent one side of the reinforcing members, and at least one ply is imbedded in the resilient material in the median portion on the side of the reinforcing member opposite to the side on which said reinforcing member is located in the edge portions.

6. A belt as defined in claim 4 wherein the rows of mating engagement means includes rows of spaced-apart openings defined in each edge portion of the belt for accommodating sprocket teeth.

7. An endless driving track as defined in claim 6 wherein wear-resistant clips are provided between the sprocket openings of the belt around the exposed portion of the reinforcing member.